United States Patent [19]

McCollum et al.

[11] Patent Number: 4,648,094
[45] Date of Patent: Mar. 3, 1987

[54] CHROMIUM (3+) DOPED GERMANATE GARNETS AS ACTIVE MEDIA FOR TUNABLE SOLID STATE LASERS

[75] Inventors: Bill C. McCollum, Marlborough; Peter T. Kenyon, New Bedford; Leonard J. Andrews, Wayland, all of Mass.

[73] Assignee: GTE Laboratories Incorporated, Waltham, Mass.

[21] Appl. No.: 879,833

[22] Filed: Jun. 26, 1986

Related U.S. Application Data

[63] Continuation of Ser. No. 618,704, Jun. 8, 1984, abandoned.

[51] Int. Cl.$^4$ ................................................ H01S 3/16
[52] U.S. Cl. ............................................ 372/41; 372/68
[58] Field of Search ................... 372/41, 20, 39, 5, 68; 252/301.17

[56] References Cited

PUBLICATIONS

Christensen et al.; "Broad-Band Emission from Chromium Doped Germanium Garnets; *IEEE JQE* vol. QL-18, No. 8, Aug. 82.

*Primary Examiner*—Leon Scott, Jr.
*Attorney, Agent, or Firm*—Martha Ann Finnegan; Frances P. Craig

[57] ABSTRACT

A laser medium containing a chromium (3+) doped germanate garnet represented by the general formula: $Ca_3M_{2(1-x)}Cr_{2x}(GeO_4)_3$ wherein M is $Al^{3+}$, $Ga^{3+}$, $Sc^{3+}$, $Lu^{3+}$, or $Y^{3+}$ and $0 < x \leq 0.25$ is disclosed. A laser employing the above-described laser medium is also described.

10 Claims, 5 Drawing Figures

CHROMIUM (3+) DOPED GERMANATE GARNETS AS ACTIVE MEDIA FOR TUNABLE SOLID STATE LASERS

The Government has rights in this invention pursuant to contract DAAK20-82-C-0134 awarded by the Department of the Army.

This is a continuation of co-pending application Ser. No. 618,704 filed on June 8, 1984, abandoned.

BACKGROUND OF THE INVENTION

This invention relates to solid state lasers. More particularly, this invention relates to solid state tunable lasers and media therefor.

Solid state lasers which are fluorescent metal ions incorporated into insulating hosts as the active laser medium are well established to have the capability of delivering very high output powers. One disadvantage of these high output solid state lasers is that they can only be operated at a few fixed wavelengths. In many applications, it would be advantageous to have continuously tunable high power coherent light sources. Until recently, such continuously tunable high power coherent light sources could only be achieved in the visible or near infrared by using liquid organic dye lasers. Liquid organic dye lasers however, have none of the practical advantages of compactness, durability, and reliability of solid state devices. One of the first reported broadly tunable, high power solid state lasers was made from certain transition metal ions doped into $MgF_2$ crystals. These early devices are restricted to the 1 $\mu$m to 2 $\mu$m band and can only be operated cryogenically.

An advance in this field was made with the announcement of the alexandrite ($BeAl_2O_4:Cr^{3+}$) laser. The alexandrite laser was demonstrated to have room temperature lasing tunable from 0.70 $\mu$m to 0.82 $\mu$m. Examples of other broadly tunable $Cr^{3+}$ doped laser media include emerald ($Be_3Al_2Si_6O_{18}:Cr^{3+}$), gadolinium scandium gallate garnet ($Gd_3Sc_2(GaO_4)_3:Cr^{3+}$) and ordered perovskites ($K_2NaScF_6:Cr^{3+}$).

SUMMARY OF THE INVENTION

In accordance with the present invention, there is provided a class of insulating hosts for a tunable chromium (3+) laser which has significant advantages over previously described materials. In accordance with one aspect of the present invention, a laser medium includes a chromium (3+) doped germanate garnet of the general formula

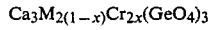

wherein M is selected from the group consisting of $Al^{3+}$, $Ga^{3+}$, $Sc^{3+}$, $Lu^{3+}$, and $Y^{3+}$; and $$0 < x \leq 0.25$$

In accordance with another aspect of the invention, a laser includes an optical resonance cavity defined by a first totally reflective mirror and a second partially transmissive mirror. Within the cavity is an active laser medium comprising a chromium (3+) doped germanate garnet of the general formula

wherein M is selected from the group consisting of $Al^{3+}$, $Ga^{3+}$, $Sc^{3+}$, $Lu^{3+}$ and $Y^{3+}$; and $$0 < x \leq 0.25.$$

An optical pumping means is disposed adjacent to the optical cavity for exciting the laser medium to emit stimulated radiation. The chromium is represented by $Cr^{3+}$ ions. The cavity can further include reflective coatings on opposite surfaces of the active laser medium.

Figure 1:
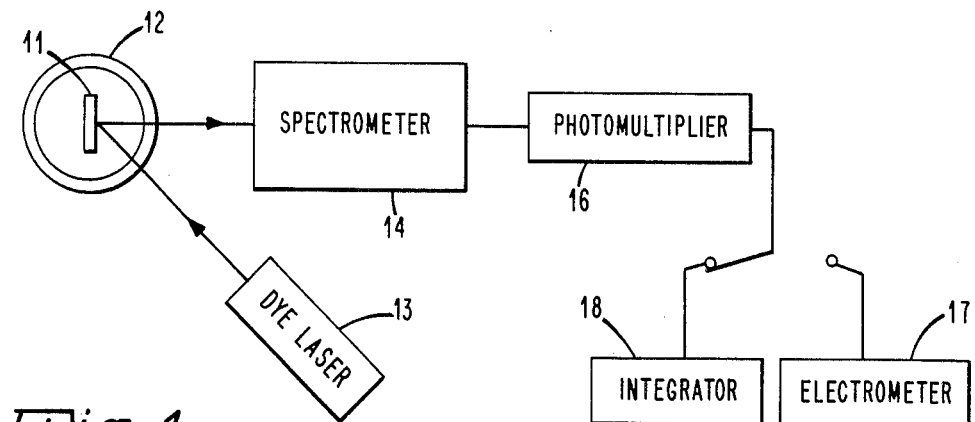
FIG. 1 is a schematic representation of the experimental arrangement employed to determine the spectroscopic properties of laser media according to the present invention.

For a better understanding of the present invention, together with other and further objects, advantages and capabilities thereof, reference is made to the following discussion and appended claims in connection with the above-described drawings.

DETAILED DESCRIPTION

The chromium 3+ doped germanate garnets of the present invention do not require high temperatures for laser operation in the far red and infrared spectral region because $Cr^{3+}$ resides in crystal sites which make the upper lasing level (spectroscopic designation $^4T_2$) the lowest excited state. In both emerald and alexandrite, the upper lasing level must be thermally populated at room temperature and large variations in laser gain result from temperature changes. The broad band fluorescence of the chromium 3+ dopant in a crystalline germanate garnet host of the general formula $Ca_3M_{2(1-x)}Cr_{2x}(GeO_4)_3$ serves as the basis for a four level solid state laser tunable over the wavelength range of about 0.7 $\mu$m to about 1.0 $\mu$m. The crystalline germanate garnet host is very important in determining the absorption and emission characteristics of the $Cr^{3+}$ dopant. The germanate garnet host for the $Cr^{3+}$ dopant in the present invention belongs to the cubic space group ($O_h^{10}$-Ia3d). In these materials, $Cr^{3+}$ substitutes for the $M^{3+}$ ion, which occupies a site of distorted octahedral symmetry. The crystalline field of the crystalline germanate garnet host splits the d orbitals of the chromium 3+ ion into a number of energy levels. The ionic radius of the $M^{3+}$ ion for which $Cr^{3+}$ substitutes in the germanate garnet host affects the ligand field strength around the $Cr^{3+}$ ion. The germanate garnets of this invention are predominantly low field materials in which luminescence from the $Cr^{3+}$ dopant occurs from $^4T_2$ state and is broad in nature, covering a wider range of the spectrum, out into the near infrared from about 700 to about 1000 nanometers. The germanate garnet materials of this invention are represented by the formula $Ca_3M_{2(1-x)}Cr_{2x}(GeO_4)_3$ wherein M is $Al^{3+}$, Ga$^{3+}$, Sc$^{3+}$, Lu$^{3+}$, or Y$^{3+}$ and is $0 < x \leq 0.25$. Preferably, M is Sc$^{3+}$, Lu$^{3+}$, or Y$^{3+}$ and $0 < x \leq 0.25$. Most preferably, M is Sc$^{3+}$, Lu$^{3+}$ or Y$^{3+}$ and $0 < x \leq 0.10$.

The Al$^{3+}$ and Ga$^{3+}$ analogs would appear to be less useful than the other compositions. Prepared materials exhibit an inhomogeneous Cr$^{3+}$ site distribution based on emission using selective wavelength excitation. It would appear that a tendency for Ga$^{3+}$ and Al$^{3+}$ to occupy tetrahedral Ge$^{4+}$ sites leads to GeO$_2$ loss with consequent F$^+$ center formation. This, in turn, reduces the population of Cr$^{3+}$ in the sample causing absorption in the Cr$^{3+}$ emission region which would be detrimental to laser performance.

The Cr(3+) doped germanate garnet of this invention is produced in such a manner that the starting materials provide the proper stoichiometry for the Cr$^{3+}$ doped germanate garnet, as represented by the general formula $$Ca_3M_{2(1-x)}Cr_{2x}(GeO_4)_3$$

wherein M is a trivalent metal ion selected from the group consisting of Al$^{3+}$, Ga$^{3+}$, Sc$^{3+}$, Lu$^{3+}$, and Y$^{3+}$; and $$0 < x \leq 0.25$$

Examples of suitable starting materials include oxides of the metals contained in the active laser media material of this invention.

The stoichiometric amounts of the starting materials are intimately mixed, and the mixture is then sealed in a platinum or platinum/rhodium tube. The sealed tubes are heated to the melting point of the garnets and are then permitted to cool, thereby resulting in a polycrystalline mass. The luminescence of that polycrystalline germanate garnet, in accordance with the invention, is highly efficient.

By the broad banded nature of the Cr$^{3+}$ germanate garnet materials produced in accordance with the invention, a wide frequency spectrum is obtained. The spectrum can be shifted by changing M$^{3+}$ in the germanate garnet host which has been doped with Cr$^{3+}$ ion and by tuning with insertion of dispersive elements into the laser cavities. The tuning range of the Sc$^{3+}$ germanate garnet is approximately 0.75 μm to 0.87 μm, while the tuning ranges of Lu$^{3+}$ and Y$^{3+}$ are farther toward the red. The materials of this invention maintain an exponential and homogeneous fluorescence decay. The fluorescent lifetime of the germanate garnet emission is comparable to that of other laser crystals so that energy storage for Q-switched operating is possible.

The fluorescence lifetime of the chromium 3+ dopant in germanate garnets is affected by the trivalent metal ion, M$^{3+}$, of the germanate garnet host. For example, the fluorescence spectrum of the Cr(3+) doped scandium germanate garnet of this invention is a broad band with maximum at 793 nm and a width at half maximum of 118 nm with a 100 μs lifetime at room temperature. The observed lifetime indicates that the quantum efficiency of chromium fluorescence is close to unity in the Sc$^{3+}$ germanate garnet host. The observed lifetime does not exhibit a change up to 2.5% replacement of Sc$^{3+}$ by Cr$^{3+}$, which demonstrates that the Sc$^{3+}$ germanate garnet is free from concentration quenching at this substitution level.

The emission spectrum and luminescence decay times of the Cr$^{3+}$ germanate garnet laser materials according to the present invention can be experimentally determined using the apparatus schematically represented in FIG. 1. A polycrystalline sample 11 of Cr$^{3+}$ doped germanate garnet material, placed in a Dewar flask 12, is excited by a tunable rhodamine 590 dye laser 13. The light emitted by the sample 11 is then passed through a 0.85 m Spex Model 1404 Spectrometer 14 (Spex Industries, Inc., 3880 Park Avenue, Metuchen, N.J. 08840), to an RCA 7102 cooled photomultiplier 16 (RCA, 20 Williams Street, Wellesley, MA 02181). The emission spectrum of the excited sample 11 is measured using an electrometer 17. Alternatively, the output of the photomultiplier 16 can be connected to a boxcar integrator 18 (Princeton Applied Research Corp., P.O. Box 2565, Princeton, N.J. 08540) to measure the luminescence decay times of the excited sample 11, under conditions of pulsed excitation by the dye laser 13.

Figure 2:
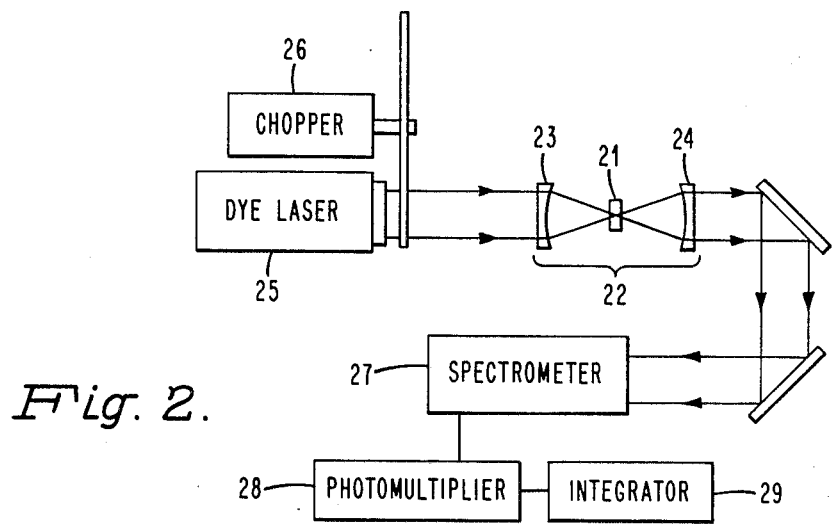
FIG. 2 is a schematic representation of the experimental arrangement employed to determine the laser properties of laser media according to the present invention.

Laser emission may be obtained using the apparatus represented schematically in FIG. 2. A small crystal 21, measuring about 0.3 mm × 0.3 mm × 0.1 mm, is mounted at the laser mode waist of a nearly concentric 10 cm optical cavity 22 of a laser. The optical cavity 22 is defined by a first spherical mirror 23 and a second spherical mirror 24. The mirror 23 is transparent to the pump radiation wavelength of 648 nanometers. The mirror 23 is totally reflective to the laser emission wavelengths, and the mirror 24 transmits approximately 0.2 percent of the laser emission wavelengths.

The crystal 21 is collinearly pumped by means of a tunable dye laser 25 which is chopped by a rotating chopper 26 to produce 500 millisecond pulses. The laser output is passed through a 0.85 meter Spex Model 1404 spectrometer 27 to a photomultiplier 28. The photomultiplier 28 output is measured using a PAR boxcar integrator 29.

With relatively long spontaneous fluorescent lifetimes, laser media according to the present invention may be used in pulsed laser devices. Q-switched operation of such laser devices is enhanced by efficient energy storage therein.

Tunable solid state lasers can be constructed according to the present invention by placing a single crystal of a chromium (III) doped germanate garnet material of the formula Ca$_3$M$_{2(1-x)}$Cr$_{2x}$(GeO$_4$)$_3$ in an optical resonating cavity defined by a first totally reflective mirror and a second mirror partially transmissive to the laser emission wavelength.

In the laser medium, M is a trivalent metal ion selected from the group consisting of Al$^{3+}$, Ga$^{3+}$, Sc$^{3+}$, Lu$^{3+}$, and Y$^{3+}$ and $0 < x \leq 0.25$.

Preferred laser media, in accordance with this invention, include Ca$_3$M$_{2(1-x)}$Cr$_{2x}$(GeO$_4$)$_3$ wherein M is Sc$^{3+}$, Lu$^{3+}$ or Y$^{3+}$ $0 < x \leq 0.25$. In more preferred laser media, M is Sc$^{3+}$, Lu$^{3+}$ or Y$^{3+}$ and $0 < x \leq 0.10$.

Figure 3:
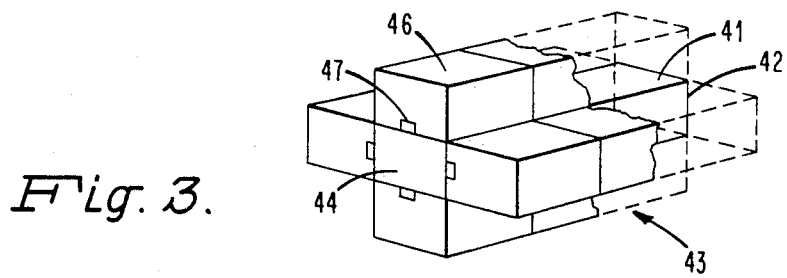
FIG. 3 is a schematic representation of a laser according to the present invention.

A single crystal 41 of laser material, according to one embodiment of the present invention shown in FIG. 3, is provided with a first totally reflective mirror 42 formed by coating an end of the crystal which is perpendicular to the lasing axis to produce the laser 43. A second partially transmissive mirror 44 is formed by coating the crystal face which opposes the first surface mirror 42. An array of light emitting diodes or laser diodes 46 are positioned adjacent to the crystal in such a way that the light emitting junction 47 of each diode is in good optical contact with the crystal 41 and aligned parallel to the crystal lasing axis. For simplicity, in FIG. 3, the electrical connections to each light emitting diode and the associated electrical circuitry required for energization of the light emitting diodes are not shown.

A Q-switched laser, using a laser medium of the present invention, comprises such laser medium disposed in an optical cavity formed by a first totally reflective mirror and a second partially reflective mirror, and an optical pumping means for exciting the medium to emit stimulated radiation, and a Q-switch means disposed in the optical cavity for interrupting the optical energy beam in the cavity.

Figure 4:
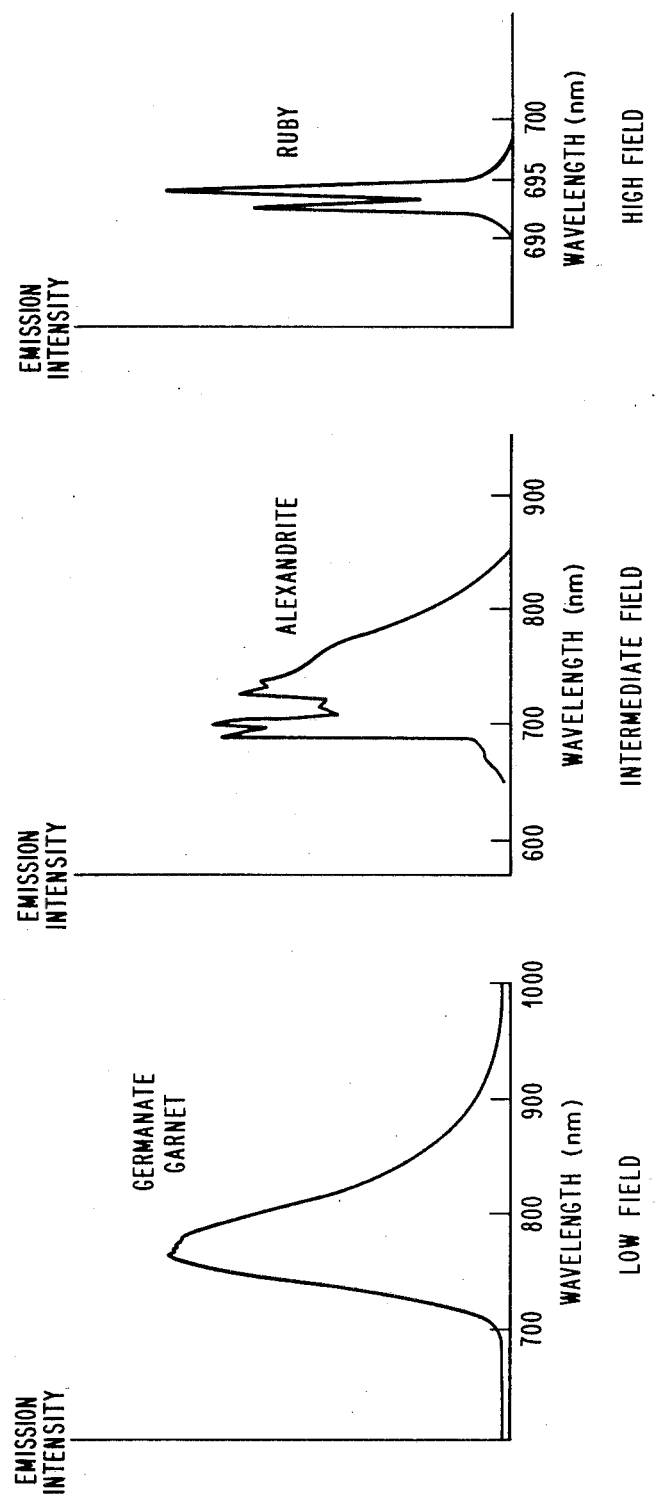
FIG. 4 illustrates the emission spectra for $Cr^{3+}$ doped germanate garnet (low field); alexandrite (intermediate field); and ruby (high field).

FIG. 4 illustrates the emission spectra for $Cr^{3+}$ doped germanate garnet (low field), alexandrite (intermediate field), and ruby (high field). The germanate garnets of this invention have a broadband emission; ruby has a narrow bandwidth emission; and alexandrite has a broadband emission which has a peak superimposed thereupon.

Figure 5:
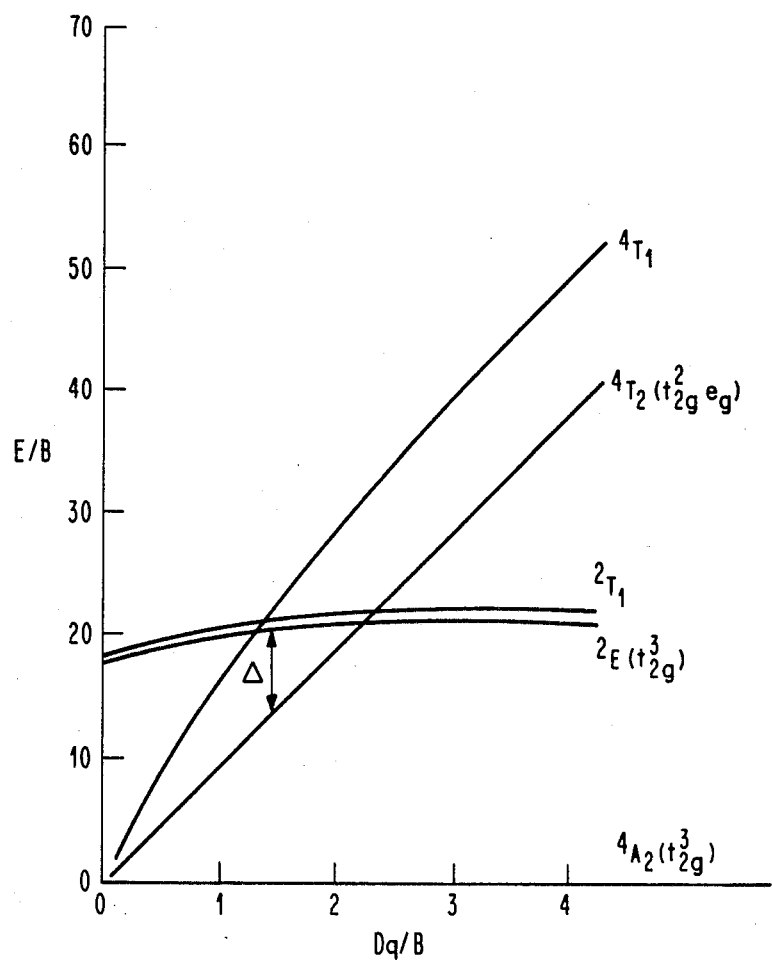
FIG. 5 is an abbreviated Tanabe-Sugano energy level diagram for $Cr^{3+}$ in an octahedral ligand field.

FIG. 5 illustrates an abbreviated Tanabe-Sugano energy level diagram for $Cr^{3+}$ in an octahedral ligand field. For the purpose of connecting the nature of the emission bands for $Cr^{3+}$ doped germanate garnet, alexandrite, and ruby, as illustrated in FIG. 4, to the ligand field, reference is made to the parameter shown in FIG. 5. $\Delta$ represents the energy difference between the $^4T_2$ and $^2E$ states.

In high field materials ($Dq/B > 2.3$), the $^4T_2$ level is higher than the $^2E$ state, i.e., $\Delta > 0$. High field materials give rise to a sharp line emission. In intermediate field materials ($Dq/B \sim 2.3$), the $^4T_2$ level approximates the $^2E$ state, i.e., $\Delta \sim 0$. Intermediate materials give rise to a mixture of sharp line and broadband emissions. In low field materials ($Dq/B < 2.3$), the $^4T_2$ level is lower than the $^2E$ state, i.e., $\Delta < 0$. Low field materials give rise to a broadband emission.

In view of the foregoing, the broadband emission of the germanate garnet of this invention corresponds to the $^4T_2$ level being lower than the $^2E$ state, which classifies $Cr^{3+}$ doped germanate garnet as a low field material. The narrow bandwidth of ruby corresponds to the $^4T_2$ level being higher than the $^2E$ state. Ruby is thereby classified as a high field material. The mixture of a broadband emission with a superimposed narrow peak for alexandrite corresponds to the $Cr^{3+}$ $^4T_2$ level approximating the $^2E$ state, which identifies alexandrite as an intermediate field material. Thus, for the low field germanate garnets and intermediate field materials such as alexandrite, one can coarsely change the wavelength of the emission over a wide range.

Thus, the major advantages of this invention include: (1) the laser materials are solids; (2) the laser materials have broadbanded emission; (3) the laser materials can be operated at room temperature; and (4) the tunabilities range is further toward the infra-red than for other tunable $Cr^{3+}$ materials.

Chromium (3+) doped germanate garnet materials suffer from lower absorption than many other materials. Because they are cubic, the absorption is generally less due to a lower transition probability. Therefore, in comparison with other materials, such as chromium in alexandrite, chromium germanate garnets may suffer from the reduced ability of being efficiently pumped.

In general, when dealing with a broad band emission material, and, in applications when it is desired to amplify the emission from one laser in a chain, sometimes involving several amplifiers, it is desired to match the frequencies of the original oscillator with subsequent amplifiers. By practicing this invention, the oscillator can be narrow band; it can be made of different material than the amplifiers. The amplifiers, being broad banded, are not subject to any limitation concerning the match of the wavelengths of the amplifier to that of the oscillator. Thus, a new degree of freedom is provided in designing a system which can involve one material for the oscillator and different materials for amplifiers which are broad banded.

Lasers based on chromium are characterized by homogeneous broadening. The band widths of such lasers are due to the characteristic that essentially every ion in the host crystal contributes the same amount of breadth towards the total emission. As a consequence, when a signal arrives from a laser oscillator, it can extract all of the energy from all of the ions in the amplifier. For glasses, this is not the case, because glasses are disordered. The width of the emission in glass is the sum total of individual widths contributed by each and every ion in the glass. Therefore, there are sub-populations of ions which have slightly different characteristics. With a signal directed into a neodymium or rare earth doped glass laser, only that portion of the energy which resides in ions being in tune at the same frequency as the original signal can be extracted. This is different in the vibronic transitions which are characteristics of the chromium in these materials.

While there has been shown and described what are at present considered to be the preferred embodiments of the invention, it will be apparent to those skilled in the art that various changes and modifications may be made without departing from the spirit and scope of the invention.

What is claimed is:

1. A laser medium comprising a chromium (3+) doped germanate garnet crystal of the general formula:

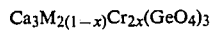

wherein M is $Sc^{3+}$, and $0 < X \leq 0.25$.

2. A laser medium comprising a chromium (3+) doped germanate garnet crystal of the general formula:

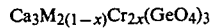

wherein M is $Lu^{3+}$, and $0 < X \leq 0.25$.

3. A laser medium comprising a chromium (3+) doped germanate garnet crystal of the general formula:

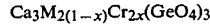

wherein M is $Y^{3+}$, and $0 < X \leq 0.25$.

4. A laser medium in accordance with claims 1, 2, or 3 wherein $0 < x \leq 0.10$.

5. A laser comprising:
an optical resonance cavity defined by a first totally reflective mirror and a second partially transmissive mirror;
an active laser medium within said cavity, said medium comprising a chromium (3+) doped germanate garnet crystal of the general formula:

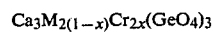

wherein M is $Sc^{3+}$, and $0 < X \leq 0.25$; and
an optical pumping means disposed adjacent to said optical cavity for exciting said laser medium to emit stimulated radiation.

6. A laser comprising:

an optical resonance cavity defined by a first totally reflective mirror and a second partially transmissive mirror;

an active laser medium within said cavity, said medium comprising a chromium (3+) doped germanate garnet crystal of the general formula:

$$Ca_3M_{2(1-x)}Cr_{2x}(GeO_4)_3$$

wherein M is $Lu^{3+}$, and $0 < X \leq 0.25$; and an optical pumping means disposed adjacent to said optical cavity for exciting said laser medium to emit simulated radiation.

7. A laser comprising:

an optical resonance cavity defined by a first totally reflective mirror and a second partially transmissive mirror;

an active laser medium within said cavity, said medium comprising a chromium (3+) doped germanate garnet crystal of the general formula:

$$Ca_3M_{2(1-x)}Cr_{2x}(GeO_4)_3$$

wherein M is $Y^{3+}$, and $0 < X \leq 0.25$; and an optical pumping means disposed adjacent to said optical cavity for exciting said laser medium to emit stimulated radiation.

8. A laser medium in accordance with claims 5, 6, or 7 wherein $0 < x \leq 0.10$.

9. A laser medium in accordance with claims 5, 6 or 7 wherein said optical pumping mean comprising at least one light emitting diode.

10. A laser in accordance with claims 5, 6 or 7 wherein said first totally reflective mirror and said second partially transmissive mirror comprise reflective coatings on opposite surfaces of said active laser medium.

* * * * *